United States Patent [19]

Mathern et al.

[11] 4,077,108
[45] Mar. 7, 1978

[54] PROCESS FOR PRODUCING DENSE MACHINABLE ALLOYS FROM PARTICULATE SCRAP

[75] Inventors: Guy Mathern; Jean Lefevre, both of Ugine; Roland Tricot, Albertville; Andre Guessier, Paris, all of France

[73] Assignee: Ugine Aciers, Paris, France

[21] Appl. No.: 667,521

[22] Filed: Mar. 16, 1976

[30] Foreign Application Priority Data

Mar. 21, 1975 France ................. 75 09563

[51] Int. Cl.² .......................................... B21C 23/04
[52] U.S. Cl. .................... 29/403; 29/420.5; 72/253 R
[58] Field of Search .......... 29/403, 420.5, DIG.47; 72/253

[56] References Cited

U.S. PATENT DOCUMENTS

| | | | |
|---|---|---|---|
| 3,626,578 | 12/1971 | Price et al. | 29/403 |
| 3,629,929 | 12/1971 | Wessel | 29/403 |
| 3,774,289 | 11/1973 | Cacace et al. | 29/403 |
| 3,810,756 | 5/1974 | Koehler | 29/420.5 |
| 3,864,809 | 2/1975 | Donachie | 29/420.5 |
| 3,922,769 | 12/1975 | Brenan | 29/420.5 |

*Primary Examiner*—E. M. Combs
*Assistant Examiner*—Daniel C. Crane
*Attorney, Agent, or Firm*—Dennison, Dennison, Meserole & Pollack

[57] ABSTRACT

The invention relates to a process for obtaining steels having improved machinability. This process provides for the upgrading of divided metallurgical products, which are consolidated without fusion, with incorporation of a dispersed phase.

This process is used in particular for scrap consisting of sheet metal or turnings, which is mixed in the desired proportion with an additive such as for example sulfur or lead. After it has been compressed the mixture is extruded in a press in the form of bars and the like.

This process is particularly suitable for producing stainless steels containing sulfur or lead. The lead stainless steels thus prepared have an excellent corrosion resistance, in addition to their machinability characteristics.

6 Claims, 1 Drawing Figure

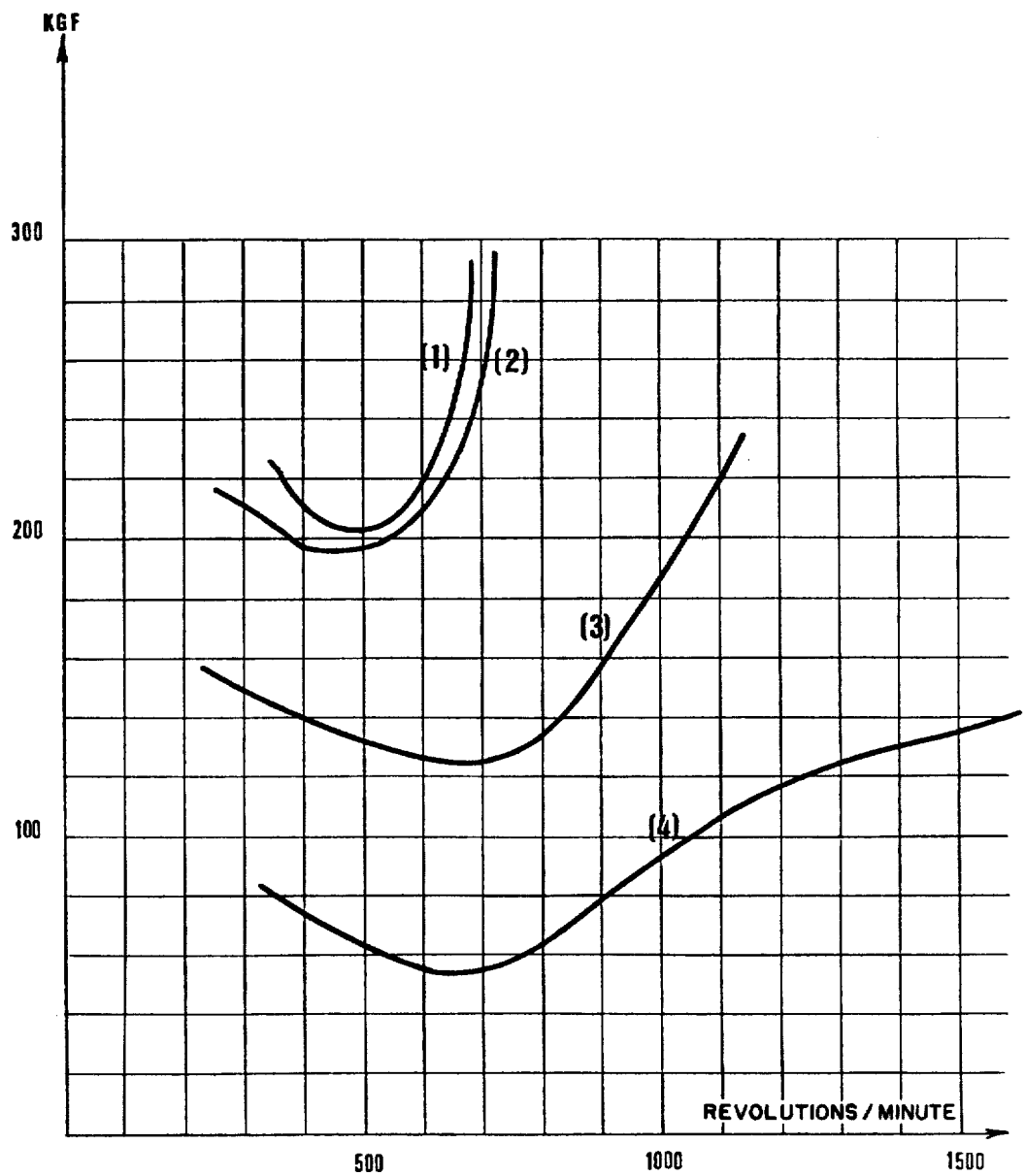

PROCESS FOR PRODUCING DENSE MACHINABLE ALLOYS FROM PARTICULATE SCRAP standard types of steels in the various industrial countries, which include additions of sulfur, selenium or lead. Table I hereinafter gives some examples chosen from construction steels and stainless steels.

TABLE I

Examples of steels having improved machining fitness which are in common use:

| STANDARD ALLOY | CONTENTS IN % BY WT. | | | | | | | | |
|---|---|---|---|---|---|---|---|---|---|
|  | C | Mn | P | S | Si | Cr | Ni | Se | Pb |
| AFNOR A 35-562- 1OF1 | 0.07 to 0.13 | 0.60 to 0.90 | <0.04 | 0.09 to 0.13 | 0.10 to 0.40 | — | — | — | — |
| AISI 1109 | 0.08 to 0.13 | 0.30 to 0.60 | <0.04 | 0.08 to 0.13 |  | — | — | — | — |
| AFNOR A35-562- 32 Pb 4 | 0.30 to 0.35 | 0.60 to 0.90 | <0.035 | <0.035 | 0.10 to 0.40 | 0.85 to 1.15 | — | — | 0.15 to 0.25 |
| AISI 1011 Pb | 0.08 to 0.13 | 0.60 to 0.90 | <0.04 | <0.05 | — | — | — | — | 0.15 to 0.35 |
| AFNOR A35-572- Z10CNF 18-09 | <0.12 | <2.0 | <0.06 | >0.15 | <1.0 | 17.0 to 19.0 | 8.0 to 10.0 | — | — |
| AISI 303 | <0.15 | <2.0 | <0.2 | >0.15 | <1.0 | 17.0 to 19.0 | 8.0 to 10.0 | — | — |
| AISI 303 Se | <0.15 | <2.0 | <0.2 | <0.06 | <1.0 | 17.0 to 19.0 | 8.0 to 10.0 | >0.15 | — |

The present invention relates to a new process for producing dense metallurgical products comprising one or more phases dispersed by means of starting materials in the divided state. In this process the consolidation of the batch is carried out in the solid state or possibly with partial fusion.

More precisely, the invention relates to the production of metallic alloys and, in particular, steels in which a dispersed phase confers special characteristics that render the alloys highly suitable for removing material by machining. Finally, the invention particularly relates to a process for upgrading metallurgical products in the divided state which are very often regarded as waste, such as scrap from sheet metal, turnings, cuttings, chips and granules, by consolidating the waste without fusion into solid metal with the simultaneous incorporation of a dispersed phase.

Numerous investigations have hitherto been carried out for the purpose of improving the fitness, or suitability of steels for machining on account of the considerable effect of machining costs on the cost price of the finished products. This is particularly true in the case of steels intended for the manufacture of mechanical articles in which the weight of metal removed by machining in the form of cuttings and chips is considerable, and is often even greater than the weight of the finished article. In the case of stainless steels such studies are particularly important, since the presence of high chromium and nickel contents greatly reduces the fitness for machining. The cuttings tend to stick to the cutting tool, to weld in some way to the cutting edge, which rapidly produces damage when the cutting speed exceeds a certain threshold. This threshold is much lower than the speeds normally used in machining ordinary steels. These investigations led to the realization of compositions of steels, in which the fitness for machining is increased by adding specially chosen elements whose specific role is now well known. Examples of these elements which may be mentioned are metalloids such as sulfur and tellurium, and also metals such as lead, tin and bismuth. At the present time there are In the case of sulfur and selenium, these elements are incorporated into the liquid steel before casting. During solidification the separation of more or less complex sulfides or selenides is observed, depending on the case. The amounts added are of the order of 0.10% for construction steels and greater than 0.15% for stainless steels, as is shown in Table I. In the case of lead, addition of amounts of the same order of magnitude is also made to the liquid steel; the lead precipitates in the grain boundaries during solidification.

These lead steels are very important but are extremely difficult to work hot. In fact, at the hot working temperatures of steel the particles of lead are in the liquid state and very easily produce fractures by hot decohesion, even in the case where very low deformation rates are set. This explains the high cost of these steels and thus their restricted use.

From the point of view of fitness for machining, it has been shown that the addition of sulfur or selenium or even lead considerably increases the performances of the cutting tools. This increase is characterized by an increased life of the tool for the same speed and depth of cutting, or, for the same tool life, by very large increases in the speed or cutting depth, and furthermore these additions make the cuttings more fragile, which facilitates their removal and prevents or reduces the phenomenon of "stuffing" or "tamping" on the tools. This latter advantage is particularly important when carrying out punching or piercing operations.

As has just been discussed, up to now the industrial production of these products involved conventional processes of classical metallurgy with the resulting limitations, mainly as regards fusion and hot working.

The present invention obviates these limitations by providing a process which is both more economical and more flexible. It is useful in particular for the manufacture of tubes, round bars, wires, flat bars and various shaped sections having improved machinability; by adding elements or compounds selected from as large a range as possible which are able to impart to these semifinished products machining characteristics adapted to their end.

In order to achieve these results the invention is unexpectedly directed to the using, as primary material, metal waste in a relatively large state of division, such as turnings, cuttings, sheet metal scrap, granules, etc. The possibility of consolidating such waste by compaction and drawing is already known. UK Pat. No. 1,220,845 in particular, discloses the manufacture of steel products by press drawing at a temperature below the melting point of the previously compressed waste from the same steel. U.S. Pat. No. 3,626,578 discloses the conditions which are necessary to obtain good metallurgical products by the same process, the products being of steel or another metal belonging to the group: Ti, Zr, Mo, Nb, Ta or W.

Finally, French Pat. No. 2,012,565 corresponding to U.S. Pat. No. 3,629,929, also describes a process for obtaining press-drawn, dense metallurgical products from cuttings. The same patent describes the possibility of modifying the characteristics of the finished products by subjecting cuttings previously compressed to 60 to 80% of the theoretical density, to deoxidation, carburation or nitriding treatments; the possibility is also suggested of mixing metallic powders whose grain size is less than 2mm with the base metal cuttings in order to modify the composition of the alloy. The examples show however that such mixtures result in the formation of alloys having a heterogeneous structure, for the additional elements cannot diffuse into the mass during the consolidation process in the solid state.

Despite the disappointing results obtained hitherto, it has unexpectedly been found that it is possible by mixing a divided alloy or metal with one or more suitably chosen additives, followed by consolication when hot, to effect a sufficient dispersion of the dispersed phase in order to obtain the desired effect as regards suitability for machining. The following non-limiting examples will provide a better understanding of the conditions for carrying out the invention.

EXAMPLE 1

Pieces of stainless steel sheet metal scrap containing 17% of chromium, type AISI 430, a few centimeters in length and about 0.5 mm in thickness, were mixed in a rotary mixer with an amount of powdered sulfur corresponding to 0.5% by weight of the mixture. 9 kg of the mixture were taken and compacted cold in a cylindrical casing 1 mm thick and 97 mm external diameter, made of the same grade steel, which was closed at its lower end and placed in the matrix of a 600 $t$ vertical press. Compacting was carried out with a piston 95 mm in diameter until the apparent density was equal to 84% of the theoretical density. The cuttings then filled the inside of the casing to a depth of 180 mm. The casing thus filled with cuttings was then taken from the matrix and cut at the level of the upper surface of the compressed cuttings, and a cap of austenitic steel was then welded on so as to impermeably seal the whole arrangement. The billet thus formed was then heated in a furnace at 1250° C and transferred to the 100 mm diameter container of a 800 $t$ extrusion press, after first having been coated with a layer of powdered glass for lubrication purposes. Under these conditions a cylindrical bar 10 mm in diameter and 14 m long was obtained by extrusion. Analysis showed a uniform distribution of sulfur at an average content of 0.5%, corresponding to the amount added. The density of the bar was equal to the theoretical value. Metallurgical tests showed that the steel obtained was sound. The sulfur was present in the form of sulfide inclusions and was uniformly distributed, though with a preferred orientation of the particles in the drawing direction. Machining tests showed that the machinability of the bars thus obtained was altogether comparable to that of bars of the same sulfur steel grade obtained by conventional processes.

EXAMPLE 2

Machining cuttings of 18-10 austenitic steel, AISI 304 type, containing an amount of powdered lead in the form of grains of average diameter 500 $\mu$m and corresponding to 0.5% by weight of the mixture, were mixed under the same conditions as in Example 1. 9 kg of this mixture was taken and compacted cold by means of the 600 $t$ press in a casing made of the same grade austenitic steel and under the same conditions as in Example 1. The density was 81% of the theoretical density and the mixture filled the casing to a depth of about 180 mm. The casing was next sealed in the same way as in Example 1, and the billet thus formed was preheated in a furnace at 1300° C and then placed in the container (100 mm diameter) of a 800 $t$ press, after first having been coated with a layer of powdered glass, and was finally extruded into a cylindrical bar 10 mm in diameter. Density measurements showed that the density was equal to the theoretical value. Analysis showed that the lead was uniformly distributed in the bar at an average concentration of 0.5%. Metallurgical examinations showed that the lead particles were uniformly distributed, though with a preferred orientation in the extrusion direction. The particles were of the order of 100 $\mu$m in length and 10 $\mu$m in width. Machining tests showed that the machinability of these bars was completely comparable to that of bars of the same grade of lead steel obtained by conventional processes. It is worth noting that, as explained in detail above, the machinability of lead steels is even better, all other things being equal, than that of sulfur steel.

The single diagram shows curves giving the variation in the axial penetration force, in kgf, as a function of the rotational velocity in revolutions per minutes in a boring test using a 6 mm diameter drill, for four ferritic stainless steels containing 17% of chromium.

Curve 1 corresponds to a 17% chromium steel, AISI 430 type, produced by fusion and worked in a conventional manner. The three other curves correspond to steels obtained by compression and drawing of a single batch of AISI 430 type base metal in the divided state in the form of sheet metal scrap; the compression and extrusion were carried out in a similar manner to that described in Example 1. In the case of curve (2), no additions were made to the base metal. In the case of curve (3) powdered sulfur was mixed with the scrap in an amount corresponding to 0.25% by weight of the mixture; finally, in the case of curve (4) an amount of powdered lead corresponding to 0.50% by weight of the mixture was added to the scrap.

Examination of these curves shows the very clear advantage of sulfur and lead steels, lead steels being far and away the best.

In addition, it was found that the lead steels according to the invention have an excellent corrosion resistance, very much better than that of sulfur stainless steels.

This corrosion resistance was evaluated from polarization curves plotted in a 2N $H_2SO_4$ medium at 23° C.

The criterion adopted is the passivity current: the greater the current the worse the corrosion resistance. Four 18-10 austenitic type stainless steels, reference numerals (5) to (8), were thus compared. Steel (5) was an AISI 304 type steel produced by fusion and worked in a conventional manner. The other three steels were obtained by compression and extrusion, a single batch of AISI 304 type base metal in the divided state in the form of cuttings, in a similar manner to that described in Example 2. In the case of steel (6), no additions were made to the base metal cuttings. In the case of steel (7), powdered sulfur was mixed with the cuttings in an amount corresponding to 0.3% by weight of the mixture. Finally, in the case of steel (8) an amount of lead corresponding to 0.5% by weight of the mixture with the cuttings.

The results obtained after treatment are given in Table II:

TABLE II

| Steel sample | Passivity current In A/cm$^2$ |
| --- | --- |
| (5) | 1 |
| (6) | 1 |
| (7) | 15 |
| (8) | 1 |

It can be seen that the corrosion resistance of lead steel obtained by the process according to the invention is completely comparable with that of steel obtained by conventional methods and without any additions. On the other hand, the sulfur steel has an appreciably lower corrosion resistance.

The examples which have just been given are specific applications of the process according to the invention, but the scope of this process is much more general. First of all, of the metalloids, sulfur may be replaced by selenium or tellurium, and it is already known that these elements may impart properties which produce improved performances. Phosphorus may also be used. Moreover, lead is not the only metal which can be used to improve the machinability. In fact, one of the reasons for choosing lead is that it is insoluble in the solid state in steel when using conventional metallurgical processes. From the time when the consolidation of the batch is carried out in the solid state, the preheating times are in general restricted to values such that even the elements which are soluble in steel in the solid state, such as aluminum, copper or nickel, do not have time to diffuse uniformly in the matrix. It is therefore possible to replace lead by many other metals, such as tin, arsenic, antimony, bismuth, aluminum, copper, nickel ar cobalt. Mixed additions consisting of several metals or metalloids may also be considered. Furthermore, compounds such as sulfides, selenides and even some intermetallic compounds may be considered as additives.

One of the basic advantages of the process is due to the use of transformation temperatures which are relatively low, much lower than the melting point of the steels, which enables elements or compounds to be dispersed in the structure, which would otherwise lose their individuality if the batch had to be melted.

As can be seen from the examples, the process works very well for various types of stainless steels. It may be used also for unalloyed steels or slightly alloyed steels. The process is also used for flow-resistant steels, refractory steels and super alloys. Its use may also be considered in the case of refractory alloys or metals such as Ti, Zr, Nb, Ta and Mo, which are not very suitable for machining. The choice of the additive or additives to be introduced will clearly depend on the conditions of use of the product.

It is also possible in this process to adjust the fineness and distribution of the dispersion in the matrix by altering the size of the particles of the base metal or alloy, as well as the nature, fineness and amount of the additive or additives which will give rise to the dispersed phase. In order to facilitate mixing between the metal or alloy in the divided state and the additive or additives, volatile substances acting as a binder, such as certain oils for example, may be considered. These binding substances should in general be removed by heating at temperatures of the order of 100° to 200° C, optionnaly under reduced pressure or in vacuo, before compacting or even after compacting, but before the sealing of the casing prior to extrusion. It is still possible to disperse the additive or additives through the divided base metal or alloy, by wetting the solid particles of this base metal or alloy with the additive or additives in a liquid state. This method can be used each time that the melting point of the additive or additives is lower than the melting point of the base metal or alloy. For example, this method is easily applied when the base metal is constituted by scraps of stainless steel and the additive is a metal or an alloy with a low melting point such as Pb, Sn, Bi, Sb, Se, Te.

The quantity of additive which can be introduced by this method depends on the specific surface of the base metal or alloy, and of the temperature of the bath.

Stainless steel scraps can be introduced during a short time within the liquid bath containing the additive or additives, then extracted and cooled.

Eventually the excess of liquid can be removed, for example by centrifugation. To limitate the quantity of additive or additives, it is possible to introduce into the liquid bath only a part of the batch of scraps, which will be later mixed with the remainder of the batch. It is possible also to spray the melted additive or additives on the surface of the divided base metal or metals. In that way, it is possible to control more easily the amount which is desired to introduce. This method can be used also with additives, which are not metals if they have a low enough melting point. This is the case, for example, of sulfur.

Finally, the degree of reduction during the consolidation operation carried out hot will also be a decisive factor. This consolidation will most often be carried out by press extension, but it may also be performed by other methods without going beyond the scope of the invention. In particular, hot rolling under a sheath may be employed. It will nearly always be preferable to perform an initial cold compacting or possibly hot compacting. If the batch contains particularly reactive metals it might be of value to carry out the initial compacting and then the sealing under a controled or inert atmosphere, or better still under a vacuum.

We claim:

1. In a process for reclaiming base metal or alloy waste in divided state for producing a stainless steel workpiece of generally theoretical density having improved machinability due to the presence of at least one dispersed phase additive, the improvement comprising effecting uniform distribution of the additive without remelting of the waste by the sequential steps of:

(a) admixing the at least one additive selected from the group consisting of S, Sn, Pb, Sb, Bi, Se, and Te and compounds thereof with at least a portion of the base metal or alloy waste;
(b) introducing the mixture of (a) into an open top cylinder of a base metal or alloy similar to the waste being processed;
(c) compacting the mixture within the casing to substantially less than theoretical density;
(d) removing excess casing above the upper surface of the compressed waste-additive mixture;
(e) impermeably sealing the open top of the casing; and
(f) consolidating the casing-waste metal-additive by hot working at a temperature below the melting point of the waste and at a temperature above the melting point of the at least one additive until a density generally equal to the theoretical density is reached.

2. The process according to claim 1 wherein the additive or additives are admixed in a liquid state with at least a portion of the base metal or alloy.

3. The process according to claim 1 wherein the consolidation by hot working is carried out by press extrusion.

4. The process according to claim 1 wherein the divided base metal or alloy is in the form of turnings, cuttings, sheet metal scrap, or granules.

5. The process according to claim 1 wherein the divided base alloy is selected from the group consisting of ferritic, semiferritic, austenoferritic, and austenitic stainless steel.

6. The process according to claim 1 wherein amounts of additives introduced are between about 0.1 and 5% by weight.

* * * * *